(12) United States Patent
Hancock et al.

(10) Patent No.: US 6,980,216 B2
(45) Date of Patent: Dec. 27, 2005

(54) GRAPHICS DRIVER AND METHOD WITH TIME PARTITIONING

(75) Inventors: William R. Hancock, Phoenix, AZ (US); Larry J. Miller, Black Canyon City, AZ (US); Michael R. Wittman, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/766,546

(22) Filed: Jan. 27, 2004

(65) Prior Publication Data

US 2005/0162434 A1 Jul. 28, 2005

(51) Int. Cl.$^7$ .............................................. G06F 15/00
(52) U.S. Cl. ...................... 345/501; 718/104
(58) Field of Search ................ 718/100, 107, 718/102–105, 108; 719/321, 323, 327; 345/501–506, 345/530, 522

(56) References Cited

U.S. PATENT DOCUMENTS 6,301,616 B1 * 10/2001 Pal et al. ................... 718/104
6,771,269 B1 * 8/2004 Radecki et al. ............. 345/503
6,809,736 B1 * 10/2004 Stauffer et al. ............. 718/104
2003/0001848 A1 * 1/2003 Doyle et al. ................ 348/501

* cited by examiner

Primary Examiner—Kee M. Tung (57) ABSTRACT

A graphics driver and method is provided that facilitates graphics rendering time partitioning to provide improved resource allocation between multiple windows and/or multiple graphics clients. The graphics driver receives high level graphics data from multiple graphics clients and outputs a time-partitioned chain of graphics primitives to the graphics processor. The graphics driver includes a partitioning controller, a graphics translator, and a chain builder. The partitioning controller allocates processing time among the multiple graphics clients, with each of the multiple graphics clients being allocated a periodic budget. The graphics translator translates high level graphics commands received from the graphics clients into graphics primitives that can be processed by the graphics processor. The chain builder creates chains of the graphics primitives that are configured to give each graphics client its associated periodic budget in the graphics processor.

41 Claims, 8 Drawing Sheets

GRAPHICS DRIVER AND METHOD WITH TIME PARTITIONING

FIELD OF THE INVENTION

This invention generally relates to displays, and more specifically applies to graphics drivers for display systems.

BACKGROUND OF THE INVENTION

Various types of optical displays are commonly used in a wide variety of applications. For example, computing devices such as personal computers, workstations, and personal digital assistants (PDA) and communication devices such as mobile phones and radios all use various types of displays. Displays are also commonly used for a variety of purposes on vehicles such as automobiles and aircraft. Optical displays can use a variety of different display mechanisms, such as LCD, CRT, projection and other devices.

In some display applications it is desirable to support multiple "windows" within a display, where each "window" is a portion of the display viewing area that is assigned a particular display task. For example, in an aircraft application, a multi-function display can be used to provide a variety of different types of information to the pilot by dividing the display into a plurality of windows, and assigning each window a display task. For example, in a multi-function display one window can be assigned to display primary flight control information such as airspeed, attitude, altitude and horizontal situation. Another window can be used to provide navigation information such as heading and location. Another window can be used to provide information such as electrical, hydraulic, or cabin pressure values or status.

In many applications, different windows in the display may have different processing requirements and criticality levels. Some windows may need to be updated at a relatively fast rate, while other windows may have less stringent update rate requirements. Some windows may, by virtue of their size or complexity, require more processing time to update. Finally, some windows may have a greater priority than other windows.

For example, in the aircraft example discussed above, the primary flight control information is of critical importance and must be updated at a high rate and at consistent update intervals in order to maintain smooth operation. Conversely, the navigation information is of less critical importance, requires considerably more rendering time due to its complexity, and its required update rate is typically significantly lower. In such an application, it is necessary to ensure that all windows receive the processing resources needed at regular intervals in order to assure that they can meet their required update rate and maintain smooth (non-jerky) operation.

To accomplish this care must be taken to assure that the processing for one window does not "starve" the other windows of needed processing resources. Otherwise, when the processing of graphics for one window is excessive, the other windows may fail to be updated as required. Unfortunately, most graphics processors do not have a mechanism to ensure that in a display with multiple windows that each window receives an appropriate allocation of processing time.

Thus, what is needed is a graphics driver system that allocates processing resources to multiple windows and enforces that allocation to assure that each window receives its needed processing allocation.

BRIEF SUMMARY OF THE INVENTION

The present invention provides a graphics driver that facilitates graphics rendering time partitioning to provide improved resource allocation between multiple windows and/or multiple graphics clients. The graphics driver receives high level graphics data from multiple graphics clients and outputs a time-partitioned chain of graphics primitives to the graphics processor. The graphics driver includes a partitioning controller, a graphics translator, and a chain builder. The partitioning controller allocates processing time among the multiple graphics clients, with each of the multiple graphics clients being allocated a periodic budget. The graphics translator translates high level graphics commands received from the graphics clients into graphics primitives that can be processed by the graphics processor. The chain builder creates chains of the graphics primitives that are configured to give each graphics client its associated periodic budget in the graphics processor. These chains are passed to the graphics processor, where it they are processed and displayed. This assures that each graphics client gets its required budget each period.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a graphics driver that facilitates graphics rendering time partitioning to provide improved resource allocation between multiple windows and/or multiple graphics clients. The graphics driver receives high level graphics data from multiple graphics clients and outputs a time-partitioned chain of graphics primitives to the hardware graphics processor. The time-partitioned chain of graphics primitives is configured to give each graphics client a periodic budget in the graphics hardware that can be enforced. Thus, each graphics clients gets a slice of each reoccurring period in the budget such that its reoccurring time to execute occurs at the desired periodic rate.

In graphics rendering systems, two types of processing time should generally be considered; the time required to prepare the data prior to sending it to the graphics processor and the time required for the graphics processor to process the data and thus render the scene. The former task is typically performed by the computer's central processing unit (CPU), while a specialized graphics processor (sometimes called a Graphics Processor Unit (GPU)) performs the latter task. Geometry computations are performed by either the CPU or the graphics processor, depending upon the capabilities of the graphics processor.

Modern microprocessors and operating systems typically provide a reliable means to partition CPU time among various tasks, such as the preparation of graphics data by multiple windows for subsequent processing by the graphics processor. Likewise, some modern graphics processors that provide hardware geometry acceleration provide primitive preemption mechanisms that can switch between multiple contexts (windows) based on geometry computation time. Unfortunately though, most graphics processors do not have a mechanism to preempt or limit graphics rendering time and thus provide no effective means of time partitioning and enforcement. The present system and method provides a graphics driver that can facilitate time partitioning and enforcement for existing graphics processors that were not designed to provide such functionality.

Figure 1:
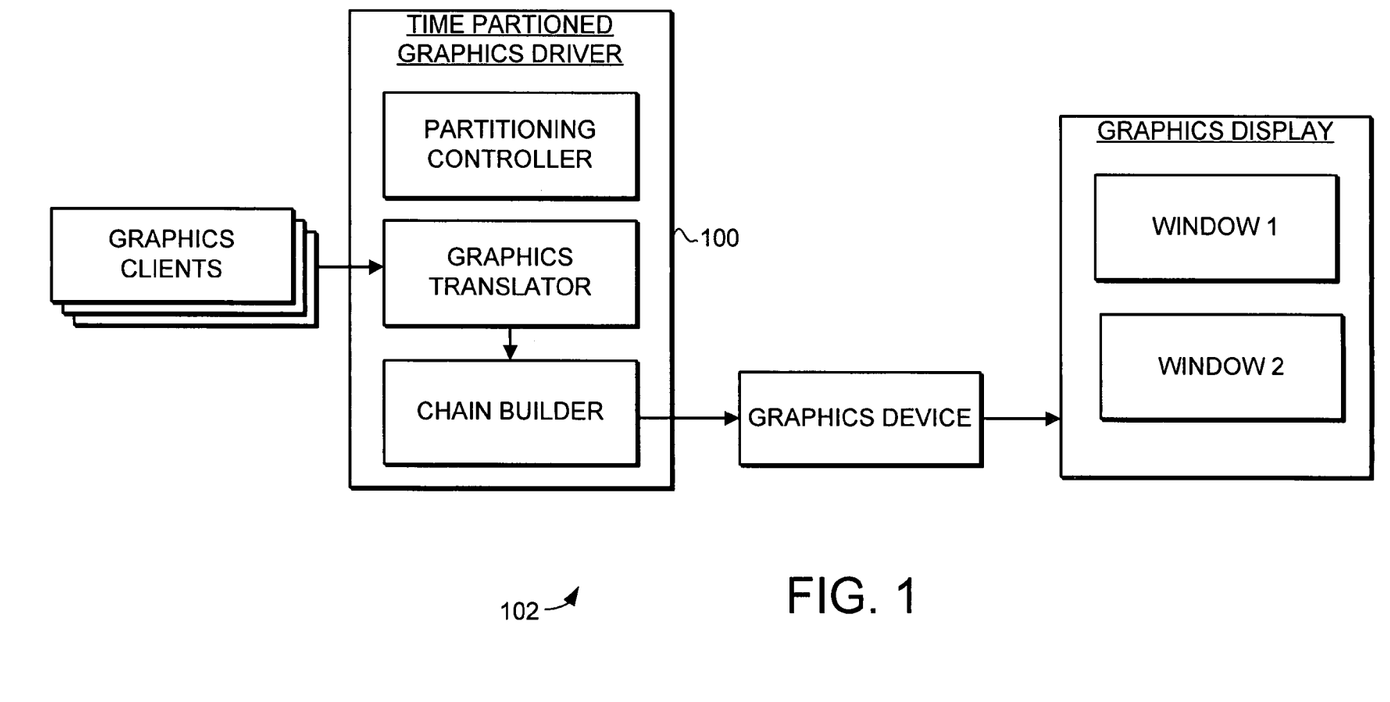
FIG. 1 is a schematic view of a time-partitioned graphics driver in an exemplary graphics system.

Turning now to FIG. 1, a time-partitioned graphics driver 100 is illustrated schematically. The graphics driver 100 is part of a graphics system 102 that includes a plurality of graphics clients, a graphics processor, and a graphics display. In this system, the plurality of graphics clients each control the image in a portion of the display, referred to generally as a display window. The graphics driver 100 facilitates graphics rendering time partitioning to provide improved resource allocation between multiple graphics clients and their associated display windows. Specifically, the graphics driver 100 receives high level graphics data from multiple graphics clients and outputs a time-partitioned stream of graphics primitives to the graphics processor.

To accomplish this, the graphics driver 100 includes a partitioning controller, a graphics translator, and a chain builder. The partitioning controller allocates graphics rendering time among the multiple graphics clients, with each of the multiple graphics clients being allocated a periodic budget. The graphics translator translates high level graphics commands received from the graphics clients into graphics primitives that can be processed by the graphics processor. The chain builder then creates chains of the graphics primitives that are configured to give each graphics client its associated periodic budget in the graphics processor.

The graphics primitive chains are passed to the graphics processor. The graphics processor processes the chains to create images on the graphics display. Specifically, the graphics processor renders the primitives to incrementally build the composite picture on the graphics display. Because of the configuration of the primitive chains, the rendering of the primitive chains will result in each of the graphics clients each getting its budgeted allotment of processing time in the graphics processor. This helps ensure that no graphics client is starved of processing resources, and that all windows on the display are updated at their required rates.

One advantage to the graphics driver 100 is that it can be adapted for use with a variety of commercial off-the-shelf devices and programs. Thus, the graphics driver 100 can provide enforceable time partitioning to a hardware graphics processor that was not designed to provide such explicit partitioning control. A relatively inexpensive hardware processor can thus be used to provide high reliability time partitioning. Likewise, the graphics driver 100 can be used to provide this time partitioning without specific support or involvement of the graphics clients themselves. Thus, the graphics driver 100 can serve as an interface between off-the-shelf processors and provide a time partitioning for multiple graphics clients without explicit support from the hardware processor or the clients themselves.

Figure 2:
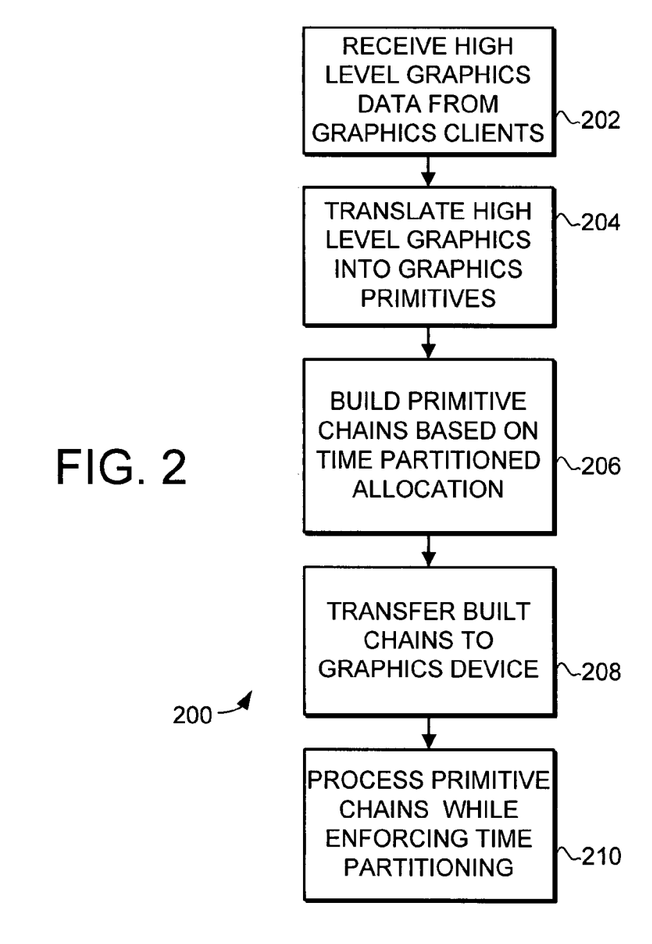
FIG. 2 is a flow diagram of an exemplary time partitioning method for a graphics driver.

Turning now to FIG. 2, a flow diagram of a time partitioning method 200 is illustrated. The first step 202 is to receive high level graphics data from a plurality of graphics clients. High level graphics data, as the term is used in this specification, comprise an application programmers' interface (API) such as OpenGL or DirectX, or any other standard or custom API.

The graphics clients can be any type of graphics applications that create any type of high level graphics data to be imaged on a display. As one specific type of graphics clients, the graphics clients can be applications that control an avionics display. As will be described in greater detail later, an avionics display is of critical importance and requires a high degree of reliability, something that can be facilitated through time partitioning. Of course, other types of graphics clients could be used, such as commonly used application programs used on the various types of computers available today. Each of the graphics clients controls the images on one portion of the display, generally referred to as a display window. Thus each portion of the high level graphics data received from the graphics clients correspond to one or more display windows. The method 200 is used to ensure that the each display window is updated at its required rate.

The next step 204 is to translate the high level graphics data into graphics primitives. Graphics primitives, as the term is used in this specification, comprise relatively "low level" data types (such as draw a line or triangle) that can be processed by a graphics processor. Each piece of high level graphics data received from graphics clients controls some aspect of the display. Likewise, each resulting graphics primitive controls some detailed aspect of the display.

The next step 206 is to build graphics primitive chains based on a time-partitioned allocation. In a time-partitioned allocation, each graphics client gets a periodic budget of rendering time in the graphics processing hardware. As the term is used in this specification, a periodic budget is one where the clients receive a defined budget allotment at regular intervals, called periods. The periods can be any suitable length, and each client is allocated a portion of each period.

The graphics primitive chains are configured to ensure that all portions or windows in the display are updated at their required rates. This is accomplished by building graphics primitive chains that are configured to give each graphics client its associated periodic budget in the graphics processor. As will be described in greater detail later, this can be accomplished by estimating the processing time of the graphics primitives and terminating graphics primitive chains when their total estimated processing time reaches the processing time allocated to their source graphics client.

The next step 208 is to transfer the graphics primitive chains to the graphics processor. The methods used for this transfer would typically depend upon the type of graphics processor used. One preferred method is to use direct memory access (DMA) as a transfer mechanism to move graphics primitive chains to the graphics processor.

The next step 210 is to process the primitive chains while enforcing the time partitioning. The graphics processor can process the primitive chains by rendering the primitives to create the display commands that form images on the display. This can be done using any suitable rendering system and method. During rendering, the processing time allocations are enforced to help further ensure that no graphics client uses more than its allocated processing time. One method for enforcing the time partitioning is to track the processing time of each graphics primitive chain. When the graphics primitive chain reaches the end of its budget, the graphics processor rendering is terminated and the processing moves to the next appropriate graphics primitive chain. In some graphics processors, the processing can be terminated by resetting the processor and moving to the first graphics primitive chain. The aborted client will then not be allowed to resume execution in its normal time slots in the periodic budget until the first graphics primitive chain that corresponds to the start of the next update for that client is received. This may cause the aborted client's window to temporarily freeze or go blank, but no other client's windows are affected by this misbehavior of the offending client.

Figure 3:
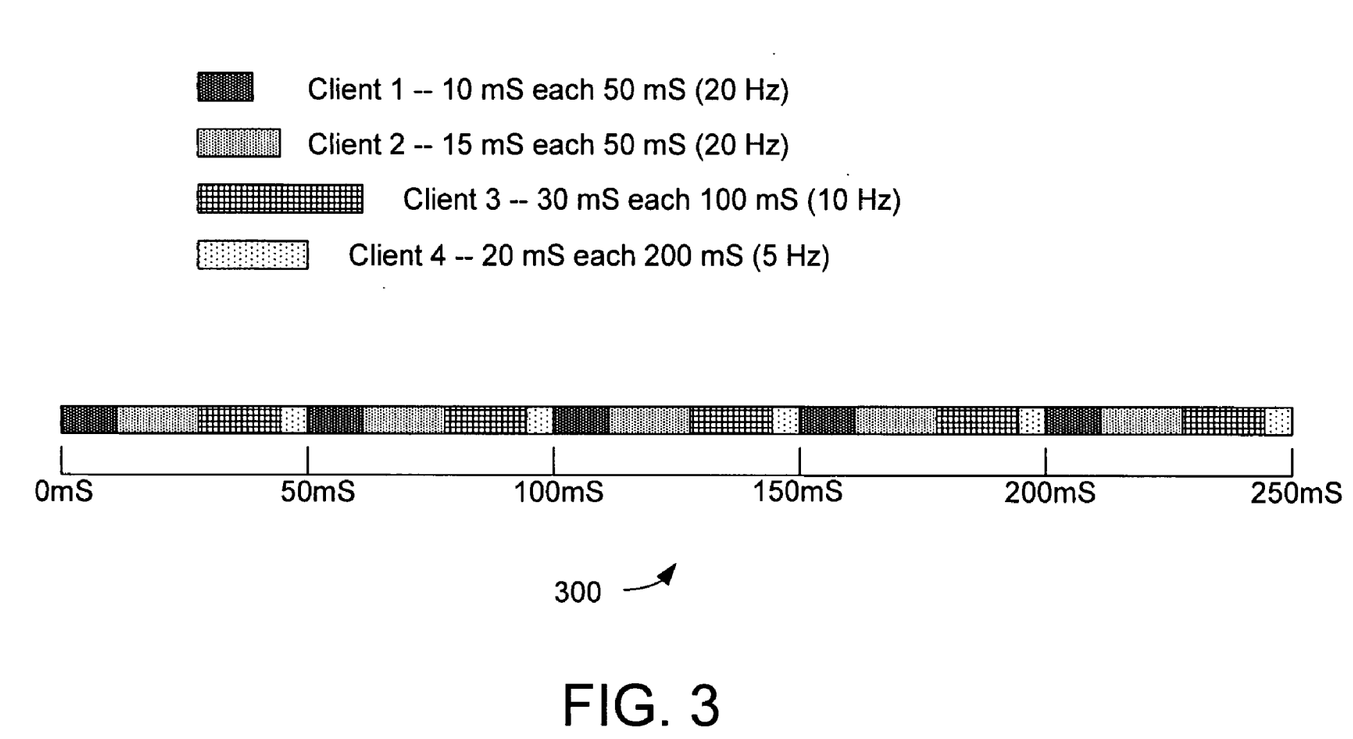
FIG. 3 is a schematic view of a time line showing an exemplary periodic budgeting scheme.

As the term is used in this specification, a periodic budget is one where the clients receive a defined budget allotment at regular intervals, called periods. The periods can be any suitable length, and each client is allocated a portion of the periods. Turning now to FIG. 3, an example of a specific periodic budgeting scheme is illustrated. In this scheme, there are four graphics clients: client 1, client 2, client 3 and client 4. Each client has its own "scene" update rate, where a scene defined as a single complete drawing of its corresponding window. Because each window is updated with a new scene at its own defined rate, and because new scenes for some clients require more processing than new scenes for other clients, each client application has it own processing requirements.

In the example illustrated in FIG. 3, the periodic budgeting scheme uses 50 millisecond periods to accommodate a maximum rate required for this example of 20 Hz. Of course, different implementations would commonly require different period rates, depending primarily on the required update rates of the graphics clients. In this example, client 1 and client 2 are 20 Hz clients, meaning that their corresponding display windows are fully updated to the next scene at 20 Hz, or once every 50 mS. Client 3 is a 10 Hz client, fully updated every 100 mS, and client 4 is a 5 Hz client, fully updated every 200 mS. Again, this is just one example of a budgeting scheme, and different implementations would typically have different periods, clients and budgeting requirements.

In order to meet these update rate requirements, each client is allocated a portion of the periods for processing, or a "periodic budget". In the illustrated example, client 1 is allocated 10 mS, client 2 is allocated 15 mS, client 3 is allocated 15 mS, and client 4 is allocated 5 mS every period. It should be noted that while the illustrated examples shows every client receiving a periodic budget allocation every period, this will not be the case for all implementations. Furthermore, while this example illustrates the entire 50 mS period being allocated every period, that will not typically be the case. In fact, in many applications the percentage of budget allocated would change as different client applications are utilized at different times. In those applications where the entire period is not allocated, there is exists rendering "slack" in the budget that can be allocated to different processes using any suitable slack scheduling method.

In the example of FIG. 3, client 1 requires 10 mS of processing time to update its scene, has an update rate of 20 Hz (i.e., once every 50 mS), and thus requires 10 mS each 50 mS period. Client 2 requires 15 mS of processing time to update its scene, has an update rate of 20 Hz, and thus requires 15 mS each period. Clients 1 and 2 thus receive sufficient allocation each period to fully update their respective scenes. This is because they both have update rates (20 Hz) that are equal the period rate.

Conversely, client 3 requires 30 mS to update its scene, has an update rate of 10 Hz (i.e., once every 100 mS) and thus requires 15 mS of processing time each period. Thus, unlike clients 1 and 2, client 3 will take multiple periods (two) to update its scene. Finally, client 4 requires 20 mS to update its scene, has an update rate of 5 Hz (i.e., once every 200 mS) and thus requires 5 mS of processing time each period. Client 4 will thus take four periods to update its scene.

Figure 6:
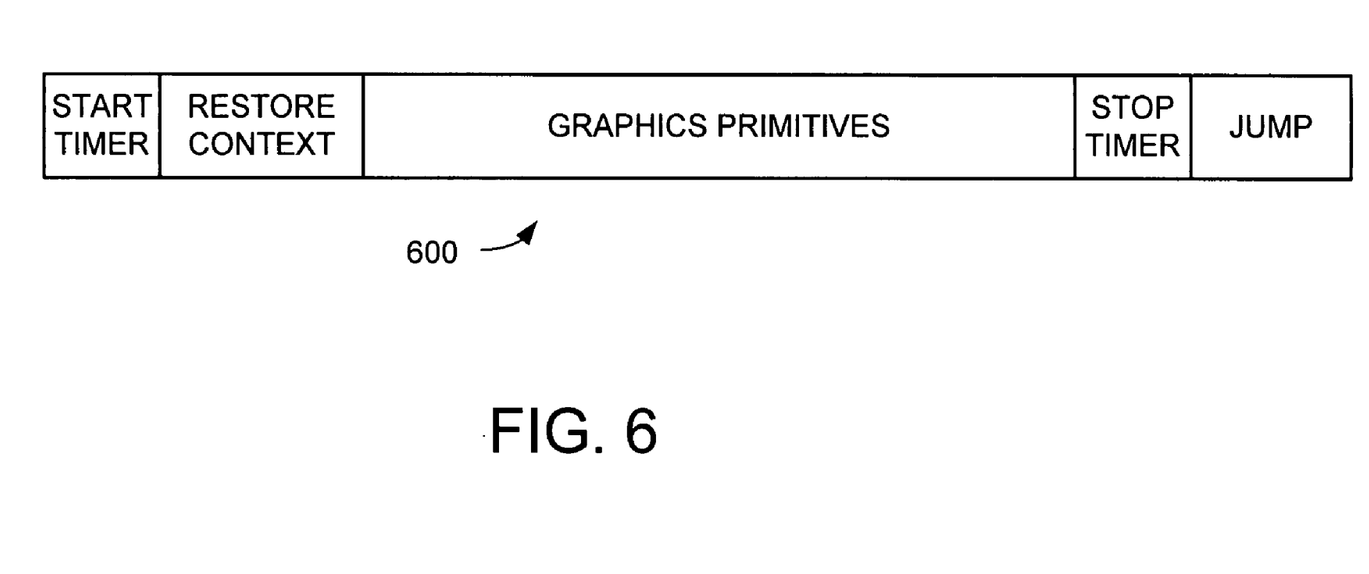
FIG. 6 is a schematic view of an exemplary graphics primitive chain.

The periodic budget allocation illustrated in FIG. 6 helps assure that each client receives its needed budget allocation such that it can update at its required rate. High priority clients such as client 1 and client 2 can be assured of getting their needed processing time every period, and thus can reliably update at their required rates.

Furthermore, this periodic allocation spreads the processing of slower clients across multiple periods. For example, instead of processing client 3 in one large 30 mS chunk, the periodic allocation gives 15 mS each period. Likewise, instead of processing client 4 in one large 20 mS chunk, the periodic allocation gives 5 mS each period. This spreading of processing time is a key to preventing a low update user from interfering with a high update client or vice versa. It also helps maintain a consistent timing between updates of each scene within each window resulting in smooth movement in the window.

Figure 4:
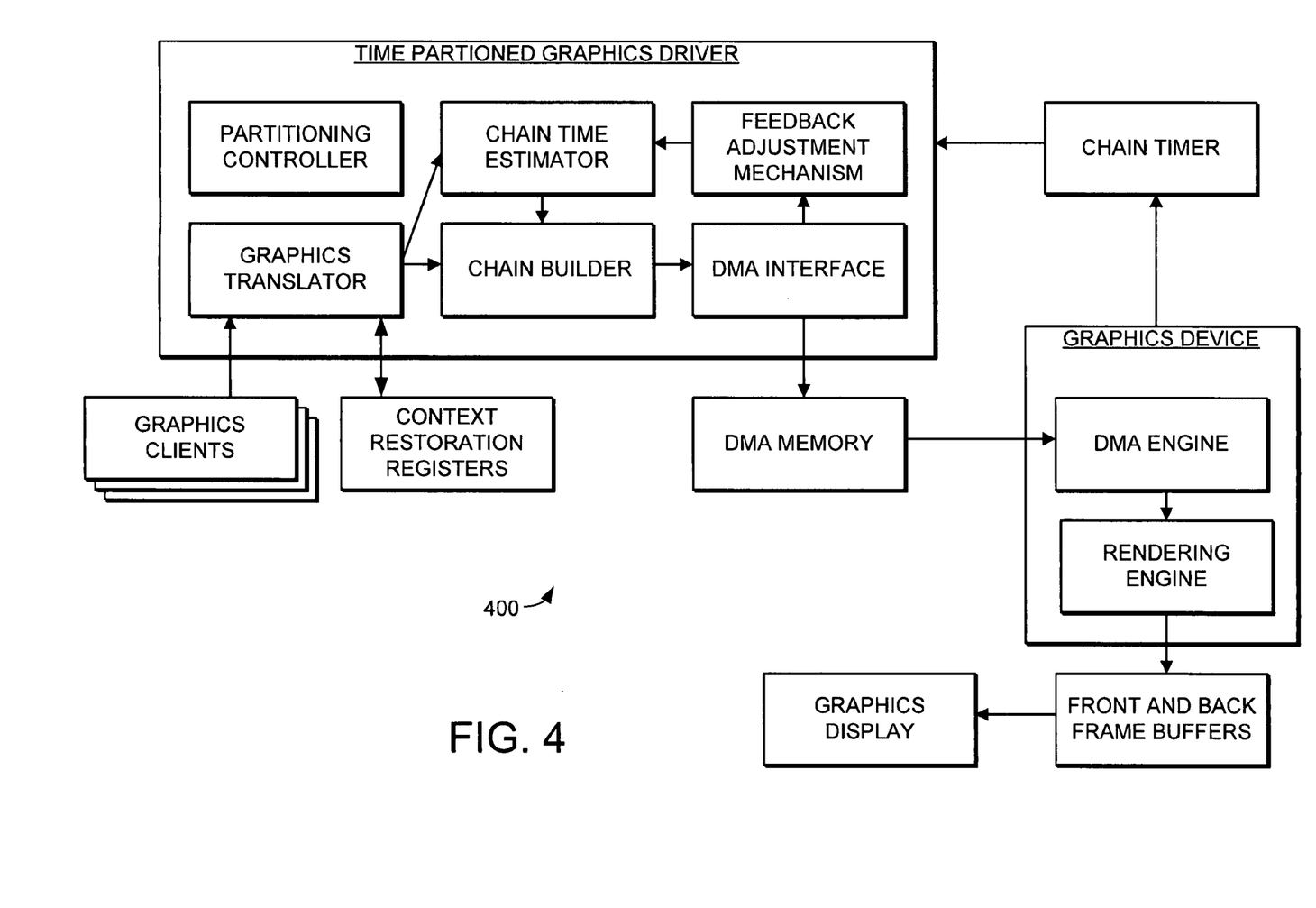
FIG. 4 is a schematic view of a preferred implementation of a time-partitioned graphics driver in a graphics system.

Turning now to FIG. 4, an exemplary graphics driver 400 is illustrated schematically. The graphics driver 400 is again part of a graphics system that receives data from a plurality of graphics clients and creates images on a graphics display. Again, each of plurality of graphics clients controls a portion of the display, referred to generally as a display window. The graphics driver 400 receives high level graphics data from multiple graphics clients and outputs a time-partitioned chain of graphics primitives to the graphics processor. The graphics processor renders the graphics primitive chains to create images on a display.

The exemplary graphics driver 400 includes a partitioning controller, a graphics translator, a chain builder, a chain time estimator, a feedback adjustment mechanism and a DMA interface. The graphics processor includes a DMA engine and a rendering engine. Also included in the system are a chain timer, a DMA memory, and front and back frame buffers.

The partitioning controller allocates processing time among the multiple graphics clients, with each of the multiple graphics clients being allocated a periodic budget. The graphics translator translates high level graphics commands received from the graphics clients into graphics primitives that can be processed by the graphics processor.

The chain builder then creates chains of the graphics primitives that are configured to give each graphics client its associated periodic budget in the graphics processor. The chain builder uses processing time estimates from the chain time estimator to determine the configuration of the graphics primitive chains. Specifically, the chain time estimator calculates an estimated processing time for each graphics primitive. The chain builder then uses the estimated processing time to determine when to terminate the graphics primitive chains.

As one example of a chain time estimator, a lookup table could be used that lists equations for generating estimated rendering times for the various different types of primitives in various types of environments. This table can be generated through experimentation, processing primitives on a particular graphics processor and measuring their processing time. The table can include the equations for generating estimated processing times for the various primitives as a function of the primitive's size, shape and other factors.

For example, an equation to generate the time to render a particular triangle can be included in the table. The time required to render triangle, while very hardware specific, is generally quite consistent from triangle to triangle, given the same rendered area, shading mode, aliasing strategy, etc. Likewise the time to render other primitives, such as lines and points. The lookup table can list equations used to generate the rendering times for these primitives at different areas, shading modes and aliasing strategies. Furthermore, the primitive table can include equations for generating estimated times for other primitive operations, such as buffer clears and register writes. Once constructed, such a lookup table can be used to provide efficient and accurate estimation of rendering time for each primitive. The output of the table can also include an overhead component for the primitive and then a pixel or size based component. For example, the triangle will require some minimum time for execution plus a time per pixel to actually fill an area. Using the area of the triangle (to estimate number of pixels covered) multiplied by the fill rate factor plus the overhead component yields the final time estimate for that triangle primitive.

The chain builder tracks the total estimated processing time for a graphics primitive chain and terminates the chain when it reaches a length that would exhaust the budget allocated its client for that period. Thus, the chain builder can assure that each client uses only its allocated processing time by limiting the length of its primitive chain such that it can be processed within the periodic budget. It should also be noted that in determining when to terminate a graphics primitive chain it will generally be desirable to leave a small portion of the periodic budget unused. Saving some portion of the periodic budget leaves processing time available to terminate a chain and start processing the next primitive chain. Furthermore, it potentially compensates for unforeseeable variances in processing time.

Generally, the chain builder only builds and transfers one chain for each client during the rendering period. This helps prevent one graphics client from stealing extra rendering time by flooding the rendering hardware with chains, to the exclusion of those from other windows.

It should also be noted that the chain builder would also preferably terminate the chain at the end of a scene and insert the commands to display the new scene once rendering is completed. The last primitive of each scene thus cause the graphics processor to swap the front and back buffer, making the new scene visible. Subsequent primitives then begin building a fresh scene in new chain which will be stored in the opposite buffer.

The DMA interface and DMA memory are used to transfer graphics primitive chains to the graphics processor. DMA is a preferred method of transferring graphics primitive chains because it typically does not require processor intervention on a word by word basis and because the graphics processor can autonomously access words at the appropriate rate to keep the data pipelines from going empty. To transfer the chains, the DMA interface writes the chains to DMA memory in the order they are received from the chain the builder. When the graphics processor is ready the process the chains, they are read from the DMA memory by the DMA engine. Generally, any suitable DMA system can be used to transfer the graphics primitive chains to the graphics processor. It should be noted that DMA is just one type of mechanism that can be used to transfer the chains, and that other suitable systems could also be used.

The graphics processor processes the received graphics primitive chains to create images on the graphics display. Specifically, the rendering engine processes the primitives to incrementally create the newest scene on the graphics display. Because of the configuration of the primitive chains, the rendering of the primitive chains will result in each of the graphics clients getting its budgeted allotment of processing time in the graphics processor. This helps ensure that no graphics client is starved of processing resources, and that all windows on the display are updated at their required rates.

The rendering engine stores the incremental image data to front and back frame buffers. The front and back frame buffers provide the storage for the data that is being imaged on the display. The front and back frame buffers each includes a defined buffer portion for each display window. Thus, there is a front and back buffer for each display window in the display. When a complete scene of a particular window is rendered into the back buffer of the frame buffer, a command is sent to swap the newly rendered scene from the back buffer to the front buffer for display. Rendering is done into the back buffer and readout from the front buffer. These buffers can be setup as either ping/pong (alternate front/back buffers in memory) or by copying the back buffer to the front buffer. This particular implementation assumes that graphics primitives for the next scene of that window are processed, they are rendered into the alternate buffer. Thus, the front and back frame buffers are rendered into in an alternating fashion, with one buffer storing the currently completed scene, and the other buffer ready to receive data for next scene. Again, this is done on a window-by-window basis, with different portions of the front and back frame buffers being swapped at rates that correspond to the different update rates of their corresponding graphic clients.

The context restoration registers are configured to store context data concerning the current state of the graphics processor. As hardware registers are changed during processing, those changed are tracked in the context restoration registers. Preferably, there exists a set of context restoration registers for each display window. The context restoration registers allow processing for a graphics client to be ended at any time by maintaining the data that is needed to restart the processing. Thus, when a graphics primitive chain is terminated and then resumed, the previous context for that window is restored before the next set of primitives are rendered. This puts the graphics processor back into the correct state for rendering the graphics primitive chains for that display window. Thus, the context restoration registers basically mirror the hardware context registers and allow for a rendering context to be suspended and resumed at a later time.

The chain timer tracks the processing time for the graphics primitive chains. The tracked processing time can be used to adjust the operation of the chain time estimator and to enforce the periodic budgets. The chain timer can be implemented with a variety of suitable mechanisms. For example, a chain timer can be formed in FPGA or other suitable programmable device and coupled to the graphics processor and the graphics driver. In one embodiment, the chain timer is implemented with multiple timers. One timer is started and stopped for each context to measure rendering time for that client, and the other used to trigger a timeout interrupt when a chain is about to exceed its budgeted allotment of time.

The chain timer can then be activated by placing appropriate packets in each of the graphics primitive chains. For example, putting a "start timer" packet at the beginning of each graphics primitive chain and a "stop timer" packet at the end of each graphics primitive chain will result in the chain timer tracking the processing time for that chain. An important consideration is that the start/stop of these timers typically needs to be synchronized with the actual rendering operations. This implies that the timer control needs to have the same pipeline delays as is occurring for the rendering primitives.

The feedback adjustment mechanism is used to adjust the operation of the chain time estimator. Specifically, the feedback adjustment mechanism compares the actual processing time measured with the chain timer to the estimated processing time calculated by the chain time estimator. From this, the accuracy of the original estimated processing time can be calculated. Furthermore, this allows the parameters used to calculate chain time estimates to be updated based on the measured processing time. Thus, if the measured processing time exceeds the estimated processing time by some amount, the feedback adjustment mechanism can adjust the parameters used by chain time estimator to increase the estimated time for graphics primitives from that client. Likewise, if the measured processing time consistently is less than the estimated processing time amount, the feedback adjustment mechanism can adjust the coefficients used by the chain time estimator decrease the estimated time for graphics primitives from that client. In either event, the chain timer and feedback adjustment mechanism are used to improve the accuracy of estimates from the chain time estimator.

As stated above, the chain timer can also be used to enforce the periodic budgets allocated to each client. Specifically, during rendering, the processing time allocations are enforced to help further ensure that no graphics client uses more than its allocated processing time. Otherwise, a poor behaving graphics client could potentially take significantly more than its allocated budget. One method for enforcing the time partitioning is to track the processing time of each graphics primitive chain using the chain timer. When the chain timer reaches a point where the graphics primitive chain is about to exceed its budget, the graphics processor rendering is ended and the processing moves to the next appropriate graphics primitive chain. In some graphics processors, the processing can be ended by "resetting" the graphics processor and moving to the graphics primitive chain that corresponds to the next window in the periodic budget. Resetting the graphics processor clears the device out, and puts it in a state in which it can begin to render new graphics primitive chains.

It should be noted that it would generally be desirable to end processing of a graphics primitive chain before the entire periodic budget has been used. Specifically, it is desirable to terminate with enough time remaining in the budget to complete the ending process and start on the next graphics primitive chain before the budget is completely exhausted. This ensures that the processing overhead required to switch to the next chain is available in the current budget, and that none of the next budget is used in the context switch. Additionally, it is generally desirable to leave additional time in the budget to compensate for potential errors in the chain time estimation.

In most cases when primitive chain processing has to be manually stopped it will be desirable to discard all remaining primitive chains that are part of the scene being currently rendered for the graphics client, and proceed to the first primitive chain for the next scene of that graphics client. The display will thus continue to display the past scene in the current frame buffer until the next scene is rendered and ready. Thus, the window display will skip a scene for that client, but will be able to fully render the next scene. This avoids inconsistent or an incorrect scene when the scene is aborted before being finished, as the act of resetting the hardware will typically cause rendering errors.

The graphics driver 400 and its associate elements are thus one example of a graphics system that can provide a time-partitioned allocation of processing time to a plurality of different graphics clients, and ensure each graphics client gets its required budget each period.

Figure 5:
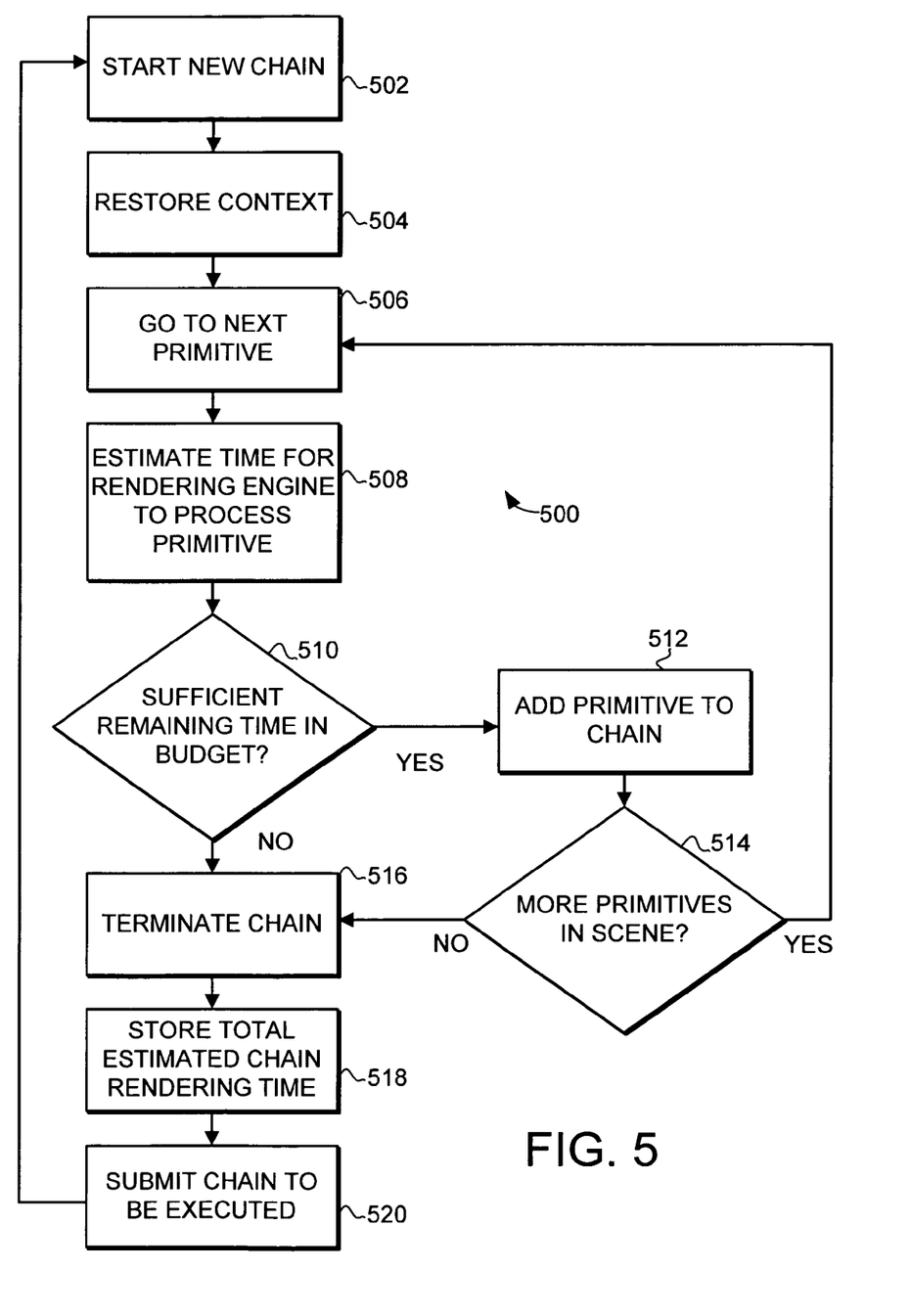
FIG. 5 is a flow diagram of an exemplary graphics primitive chain building method.

Turning now to FIG. 5, a method 500 for building graphics primitive chains is illustrated. The method 500 results in graphics primitive chains that are configured to provide a time-partitioned allocation of processing time to a plurality of graphics clients. The first step 504 is to start a new primitive chain. Generally a new primitive chain is created for every periodic budget allotment, and at the beginning of each new scene for a client. In starting a new primitive chain, a packet to start a timer and restore the context (or set the default context at the start of the next scene) of the driver is preferably included. This returns the driver the operational status that existed when the last chain for this client completed processing. Thus, the graphics driver is able to restart the new chain as if the previous chain for the client had just completed.

The next step 506 is to go to the next primitive for the current graphics client. This is the primitive that will be added next to the graphics primitive chain. The next step 508 is to estimate the rendering time needed to processes the primitive. This can be done using a variety of techniques. As one example, the rendering time can be estimated using a lookup table, where for example, the rendering of a triangle is based on the number of pixels covered by that triangle. Similarly, the time to draw a line can be estimated based on the length of the line.

The next step 510 is to determine if there is sufficient time remaining in the periodic budget to process the current primitive. If there is sufficient time, the next step 512 is to add the current primitive to the graphics primitive chain. If there is not sufficient time, the next step 516 is to terminate the chain.

Returning to step 512, if there is sufficient time in the periodic budget to process the current primitive, the next step 514 is to determine if thee are more primitives in the current scene. If there are more primitives in the current scene, the method returns to step 506, where the next primitive is obtained, its processing time estimated (step 508), and it is added to the budget if sufficient time remains (steps 510 and 512). Thus, steps 506–514 continue until all of the primitives for the current scene are added to the chain or until there is no longer sufficient time in the budget for additional primitives.

When either all of the primitives for the current scene are added to the chain or there is no longer sufficient time in the budget for additional primitives, the next step 516 is to terminate the chain. When the chain is terminated, no additional primitives are added to that chain. The next step 518 is to store the total estimated chain rendering time. The stored estimated chain rendering time will be used to determine the accuracy of the rendering time estimation.

The next step 520 is to submit the completed chain to the hardware graphics processor for rendering. As described above, this can be accomplished by using DMA memory and a DMA interface.

After step 520, the method returns to step 502. There a new chain, typically for the graphics client that has the next periodic budget allocation, is started, and the processes continues. Thus, method 500 results in graphics primitive chains that are configured to provide a time-partitioned allocation of processing time.

Turning now to FIG. 6, a schematic view of an exemplary graphics primitive chain 600 is illustrated. The graphics primitive chain 600 includes a start time packet, a restore context packet, a stop time packet and a jump packet. Also included are the graphics primitives that are to be rendered by the graphics processor. Of course, these are just simplified examples, and specific implementations could include different types of data packets.

The start and stop timer packets are used to start and stop a chain timer. As described above, the chain timer measures the actual processing time used to render the graphics primitive chain. This measurement can be used to adjust the parameters that estimate the processing time for graphics primitives, helping improve the accuracy of the estimation. This measurement can also be used to enforce the allocated partition by ending processing of the chain when it is about to exceed its budget. As discussed above, the processing can be ended by resetting the graphics processor, discarding any remaining chains for the current scene, and moving to the first chain for the next scene. The start and stop timer packets are used to control the chain timer to facilitate this functionality.

The restore context packet is used to restore the past operational parameters of the graphics processor or to load the initial default context. As stated above, the operational parameters of the graphics processor are preferably stored in a set of context restoration registers. The data from the context registers can then be used to restore the context of the graphics processor. In particular, the graphics processor is restored to the operational parameters that existed when the last chain for this graphics client was processed. This ensures that the graphics processor is able to start processing primitives for this client where it left off when the last periodic budget for this client ended.

The jump packet is used to link graphics primitive chains together. In particular, when a graphics primitive chain is stored in memory, the jump packet is preferably configured to point at itself. When processed by the graphics processor the jump packet causes the end of the chain to effectively point at itself, resulting in the graphics processor looping on itself. When the next chain is added to memory, the jump packet for the previous chain is modified to point at the first packet in the next chain. Thus, the previous chain is hot linked to the next chain. This provides the ability to automatically link between consecutive client primitive chains without direct processor intervention. Thus, processor intervention is required only if the timer causes the current primitive chain to be aborted.

Figure 7:
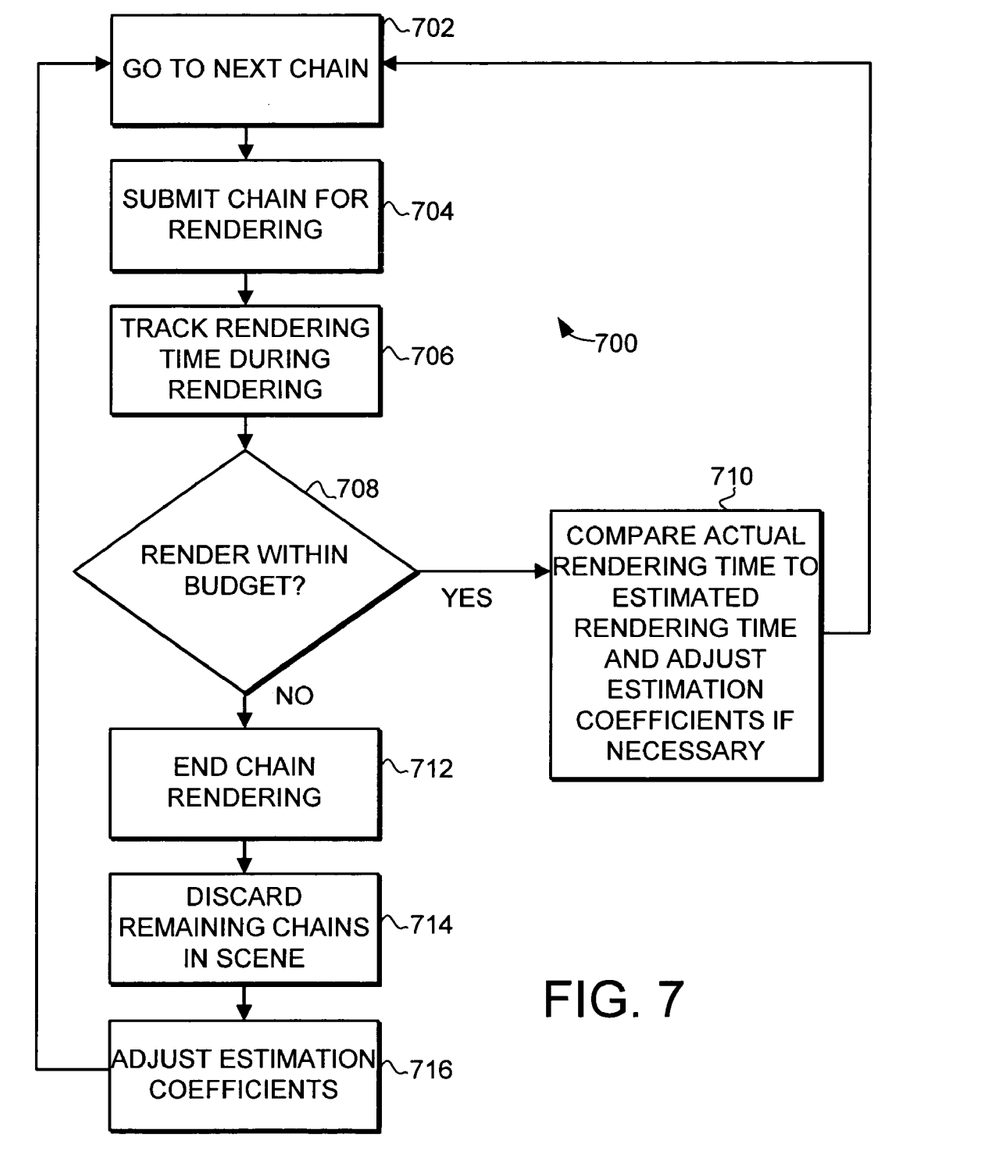
FIG. 7 is a flow diagram of an exemplary time partitioning enforcement method.

Turning now to FIG. 7, a method of enforcing a periodic budget is illustrated. The first step 702 is to go to the next chain that is to be processed. As described above, in the preferred embodiment one chain is formed and submitted for each client each period. In step 702 the next chain is the chain that is to be processed in the next allocated periodic budget for the next client.

The next step 704 is to submit the chain to the graphics processor for rendering. The next step 706 is to track the rendering time used to the rendering of the chain. Again, this can be done using a suitable chain timer, as discussed above. The next step 708 is to determine if the chain has rendered within its allocated periodic budget. Again, this can be done using a chain timer as discussed above.

If the chain has rendered within its periodic budget, the next step 710 is to compare the actual rendering time to the estimated rendering time, and to adjust the estimation coefficients used to estimate rendering time as necessary. Step 710 thus helps improved the accuracy of the estimation process by providing adaptive feedback. The method then returns to step 702, where it goes to the next chain supplied by the chain builder. The process continues, rendering while tracking time and adjusting estimation coefficients as necessary.

If a chain ever fails to render within its periodic budget the method goes to step 712 instead of step 710. At step 712 the chain rendering is ended. As discussed above, this can be accomplished by resetting the graphics processor when the chain timer reaches the end of the allocated budget time. The next step 714 is to discard the remaining chains in the current scene. When a chain is ended prematurely, the remaining chains in the same scene are discarded to avoid the creation of a partially completed scene change in the frame buffer. Thus, every subsequent chain for that client is discarded until the first chain of the next scene is created by the graphics client. In the meantime, all other clients continue to operate normally and are not affected by the misbehavior of the offending client.

The next step 716 is to adjust the estimation coefficients. Because the rendering time exceeded the budget allocation in step 706, the estimation coefficients must be updated to reduce the likelihood of under estimating the rendering time again. Again, this helps improve the accuracy of the estimation procedure.

The next step in the method is to return to step 702 and go to the next chain. In the case where the previous chain was terminated, the next chain will be the normally scheduled client. If there are no more clients, then this step effectively waits for the client to schedule a new chain.

Figure 8:
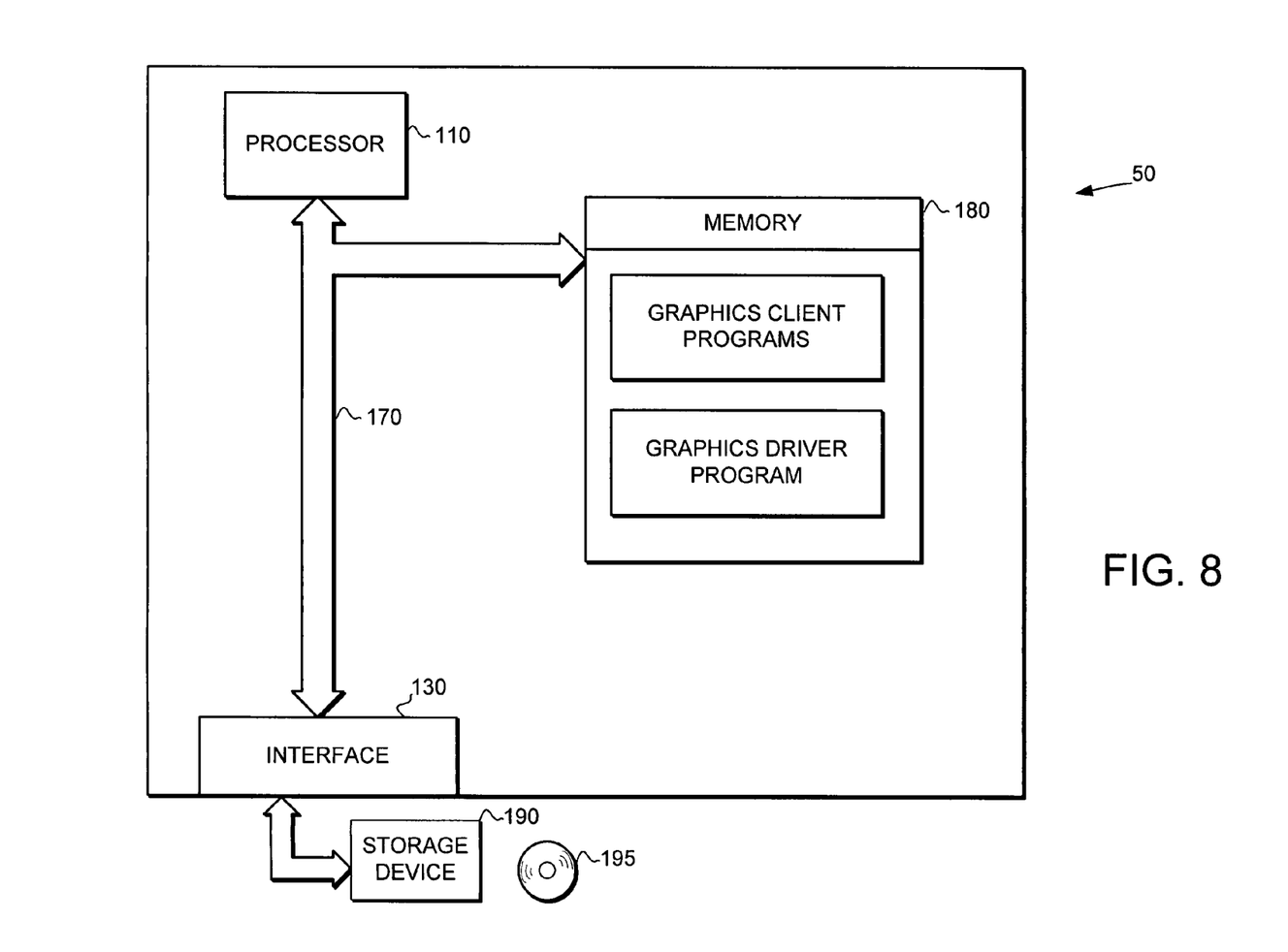
FIG. 8 is a schematic view of an exemplary computer system that includes a graphics driver program.

The graphics driver system and method can be implemented as a computer program on wide variety of platforms. Turning now to FIG. 8, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft or on a ground based personal computer. The exemplary computer system 50 includes a processor 110, an interface 130, a storage device 190, a bus 170 and a memory 180. In accordance with the preferred embodiments of the invention, the memory system 50 includes a time-partitioned graphic driver program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as memory cards, hard disk drives, flash systems, floppy disk drives and optical disk drives. As shown in FIG. 8, storage device 190 can comprise a disc drive device that uses discs 195 to store data.

In accordance with the preferred embodiments of the invention, the computer system 50 includes a graphics driver program. Specifically during operation, the graphics driver program is stored in memory 180 and executed by processor 110. When being executed by the processor 110, graphics driver program receives high level graphics data from the plurality of graphics client programs. The graphics driver program translates the high level graphics commands received from the graphics clients into graphics primitives that can be processed by a hardware graphics processor (not shown in this figure.) The graphics driver program creates chains of the graphics primitives that are configured to give each of the graphics clients its associated periodic budget in the graphics processor. These chains are passed to the graphics processor, where it they processed and displayed. This assures that each graphics client gets its required budget each period.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A graphics driver, the graphics driver receiving high level graphics data from a plurality of graphics clients, the graphics driver comprising:
   a partitioning controller, the partitioning controller allocating a periodic budget to each of the plurality of graphics clients;
   a graphics translator, the graphics translator receiving the high level graphics data from the plurality of graphics clients and converting the high level graphics data to a plurality of graphics primitives; and
   a chain builder, the chain builder creating a plurality of graphics primitive chains, each of the graphics primitive chains corresponding to at least one graphics client, the chain builder passing the plurality of graphics primitive chains to a graphics processor, the graphics primitive chains configured such that the graphics processor renders according to the periodic budget of each of the plurality of graphics clients.

2. The graphics driver of claim 1 wherein the plurality of graphics primitive chains are configured to have a total rendering time for each chain that corresponds to the periodic budget for the corresponding graphics client.

3. The graphics driver of claim 1 wherein each of the plurality of graphics primitive chains includes a command to restore context to the graphics processor before processing graphics primitives in the graphics primitive chain.

4. The graphics driver of claim 1 wherein each of the periodic budgets comprises a reoccurring portion of a reoccurring period.

5. The graphics driver of claim 1 further comprising a chain time estimator, the chain time estimator estimating processing time for each graphics primitive in each graphics primitive chain to determine when each graphics primitive chain should be terminated to make likely that each graphics primitive chain will be processed within the periodic budget for the corresponding graphics client.

6. The graphics driver of claim 5 further comprising a feedback adjustment mechanism, the feedback adjustment mechanism determining actual processing time for the graphics primitive chain and comparing to the estimated processing time to provide adjustment of chain time estimator.

7. The graphics driver of claim 6 wherein the feedback adjustment mechanism determines the actual processing time with a chain timer coupled to the feedback adjustment mechanism.

8. The graphics driver of claim 7 wherein each graphics primitive chain includes start packet to start the chain timer and a stop packet to stop the chain timer.

9. The graphics driver of claim 1 wherein the graphics driver enforces the periodic budget for each of the plurality of graphics clients.

10. The graphics driver of claim 9 wherein the graphics driver enforces the periodic budget for each of the plurality of graphics clients by measuring the processing time of each graphics primitive chain and resetting the graphics processor when the processing time for a graphics primitive chain will exceed its corresponding periodic budget.

11. The graphics driver of claim 10 wherein the graphics driver discards any remaining graphics primitive chains in a same scene as the graphics primitive chain that will exceed its corresponding periodic budget.

12. The graphics driver of claim 1 wherein each of the graphics primitive chains includes a jump packet, the jump packet pointing to itself when the graphics primitive chain is built and modified to point to a next graphics primitive chain when the next graphics primitive chain is built such that the next graphics primitive chain will be automatically dispatched when ready.

13. The graphics driver of claim 1 wherein the graphics driver loads a default context for a first chain of a new scene and maintains a context register set during rendering of the graphics primitive chains, such that when a scene requires multiple graphics primitive chains a context from a previous chain can be restored at the beginning of a subsequent chain.

14. A method for allocating processing time in a graphics processor, the method comprising the steps of:
    a) allocating a periodic budget to each of a plurality of graphics clients;
    b) receiving high-level graphics data from the plurality of graphics clients;
    c) translating the high-level graphics data into a plurality of graphics primitives;
    d) building a plurality of graphics primitive chains, each of the graphics primitive chains corresponding to at least one of the plurality of graphics clients, each of the graphics primitive chains configured to allocate processing time according to the periodic budget of each of the plurality of graphics clients;
    e) transferring the plurality of graphics primitive chains to the graphics processor; and
    f) rendering the plurality of graphics primitive chains.

15. The method of claim 14 wherein each of the plurality of graphics primitive chains are configured to have a total rendering time that corresponds to the periodic budget for the corresponding graphics client.

16. The method of claim 14 further comprising the step of restoring context prior to rendering each of the plurality of graphics chains.

17. The method of claim 16 wherein the step of restoring context prior to rendering each of the plurality of graphics chains comprises loading a default context for a first primitive chain in a new scene.

18. The method of claim 16 wherein the step of restoring context prior to rendering each of the plurality of graphics chains comprises loading a maintained context from rendering of a previous chain.

19. The method of claim 14 wherein each of the periodic budgets comprises a reoccurring portion of a reoccurring period.

20. The method of claim 14 further comprising the step of estimating the processing time for each graphics primitive in each graphics primitive chain to determine when each graphics chain should be terminated to make likely that each graphics primitive chain will be processed with the periodic budget for the corresponding graphics client.

21. The method of claim 20 further comprising the step determining actual processing time for the graphics primitive chain and comparing to the estimated processing time to provide adjustment of the step of estimating the processing time.

22. The method of claim 14 further comprising the step of enforcing the periodic budget for each of the graphics clients.

23. The method of claim 22 wherein the step of enforcing the periodic budget for each of the graphics clients comprises measuring the processing time of each graphics primitive chain and resetting a graphics processor when the processing time for a graphics primitive chain will exceeds its corresponding budget.

24. The method of claim 23 further comprising the step of discarding any remaining graphics primitive chains in a same scene as a current graphics chain after resetting the graphics processor.

25. The method of claim 14 wherein each of the graphics primitive chains includes a jump packet, the jump packet pointing to itself when the graphics primitive chain is modified to point to a next graphics primitive chain when the next graphics primitive chain such that the next graphics primitive chain will be automatically dispatched when ready.

26. The method of claim 14 further comprising the step of loading a default context for a first chain of a new scene and maintaining a context register set during rendering of the graphics primitive chains, such that when a scene requires multiple graphics primitive chains a context from a previous chain can be restored at the beginning of a subsequent chain.

27. A program product comprising:
    a) a graphics driver program, the graphics driver program receiving high level graphics data from a plurality of graphics clients, the graphics driver program including:
        a partitioning controller, the partitioning controller allocating a periodic budget to each of the plurality of graphics clients;
        a graphics translator, the graphics translator receiving the high level graphics data from the plurality of graphics clients and converting the high level graphics data to a plurality of graphics primitives; and
        a chain builder, the chain builder creating a plurality of graphics primitive chains, each of the graphics primitive chains corresponding to at least one graphics client, the chain builder passing the plurality of graphics primitive chains to a graphics processor, the graphics primitive chains configured such that the graphics processor renders according to the periodic budget of each of the plurality of graphics clients; and
    b) signal bearing media bearing the graphics driver program.

28. The program product of claim 27 wherein the plurality of graphics primitive chains are configured to have a total rendering time for each chain that corresponds to the periodic budget for the corresponding graphics client.

29. The program product of claim 27 wherein each of the plurality of graphics primitive chains includes a command to restore context to the graphics processor before processing graphics primitives in the graphics primitive chain.

30. The program product of claim 27 wherein each of the periodic budgets comprises a reoccurring portion of a reoccurring period.

31. The program product of claim 27 further comprising a chain time estimator, the chain time estimator estimating processing time for each graphics primitive in each graphics primitive chain to determine when each graphics primitive chain should be terminated to make likely that each graphics primitive chain will be processed within the periodic budget for the corresponding graphics client.

32. The program product of claim 31 further comprising a feedback adjustment mechanism, the feedback adjustment mechanism determining actual processing time for the graphics primitive chain and comparing to the estimated processing time to provide adjustment of chain time estimator.

33. The program product of claim 32 wherein the feedback adjustment mechanism determines the actual processing time with a chain timer coupled to the feedback adjustment mechanism.

34. The program product of claim 33 wherein each graphics primitive chain includes start packet to start the chain timer and a stop packet to stop the chain timer.

35. The program product of claim 27 wherein the graphics driver enforces the periodic budget for each of the plurality of graphics clients.

36. The program product of claim 35 wherein the graphics driver enforces the periodic budget for each of the plurality of graphics clients by measuring the processing time of each graphics primitive chain and resetting the graphics processor when the processing time for a graphics primitive chain will exceed its corresponding periodic budget.

37. The program product of claim 36 wherein the graphics driver discards any remaining graphics primitive chains in a same scene as the graphics primitive chain that will exceed its corresponding periodic budget.

38. The program product of claim 27 wherein each of the graphics primitive chains includes a jump packet, the jump packet pointing to itself when the graphics primitive chain is built and modified to point to a next graphics primitive chain when the next graphics primitive chain is built such that the next graphics primitive chain will be automatically dispatched when ready.

39. The program product of claim 27 wherein the graphics driver loads a default context for a first chain of a new scene and maintains a context register set during rendering of the graphics primitive chains, such that when a scene requires multiple graphics primitive chains a context from a previous chain can be restored at the beginning of a subsequent chain.

40. The program product of claim 27 wherein the signal bearing media comprises recordable media.

41. The program product of claim 27 wherein the signal bearing media comprises transmission media.

* * * * *